United States Patent
Dajaku

(10) Patent No.: US 10,720,801 B2
(45) Date of Patent: Jul. 21, 2020

(54) ELECTRIC MACHINE WITH A STATOR HAVING SLOTS AT THE TOOTH FOR REDUCING THE FUNDAMENTAL WAVE OF THE MAGNETIC FLUX

(71) Applicant: FEAAM GmbH, Neubiberg (DE)

(72) Inventor: Gurakuq Dajaku, Neubiberg (DE)

(73) Assignee: FEAAM GmbH, Neubiberg (DE)

( * ) Notice: Subject to any disclaimer, the term of this patent is extended or adjusted under 35 U.S.C. 154(b) by 215 days.

(21) Appl. No.: 14/397,173

(22) PCT Filed: Mar. 25, 2013

(86) PCT No.: PCT/EP2013/056265
§ 371 (c)(1),
(2) Date: Oct. 24, 2014

(87) PCT Pub. No.: WO2013/160047
PCT Pub. Date: Oct. 31, 2013

(65) Prior Publication Data
US 2015/0123510 A1    May 7, 2015

(30) Foreign Application Priority Data
Apr. 26, 2012 (DE) .................. 10 2012 103 677

(51) Int. Cl.
*H02K 1/16* (2006.01)
*H02K 1/14* (2006.01)
(Continued)

(52) U.S. Cl.
CPC .............. *H02K 1/165* (2013.01); *H02K 1/14* (2013.01); *H02K 1/141* (2013.01); *H02K 29/03* (2013.01); *H02K 19/103* (2013.01); *H02K 21/14* (2013.01)

(58) Field of Classification Search
CPC .......... H02K 1/165; H02K 1/14; H02K 1/141; H02K 21/14; H02K 19/103; H02K 29/03
(Continued)

(56) References Cited

U.S. PATENT DOCUMENTS 3,296,472 A    1/1967 Fisher
4,475,051 A *  10/1984 Chai ...................... H02K 37/04
                                                        310/162
(Continued)

FOREIGN PATENT DOCUMENTS

CN        1307394 A    8/2001
CN      102122852 A    7/2011
(Continued)

OTHER PUBLICATIONS

English Translation of DE 19510729 A1.*

*Primary Examiner* — Maged M Almawri
(74) *Attorney, Agent, or Firm* — Morgan, Lewis & Bockius LLP

(57) ABSTRACT

The invention relates to an electric machine comprising a stator and a rotor moveable relative to the stator. The stator has slots for accommodating electrical windings, wherein teeth of the stator are formed between adjacent slots. During operation of the machine, an operating wave of the magnetomotive force is different from a fundamental wave of the magnetic flux. The stator comprises at least one recess which is arranged in the tooth region and extends substantially in the radial direction.

16 Claims, 7 Drawing Sheets

(51) Int. Cl.
*H02K 29/03* (2006.01)
*H02K 19/10* (2006.01)
*H02K 21/14* (2006.01)

(58) Field of Classification Search
USPC .................................. 310/16, 106, 216.106
See application file for complete search history.

(56) References Cited

U.S. PATENT DOCUMENTS

| | | | |
|---|---|---|---|
| 4,990,809 A | 2/1991 | Artus et al. | |
| 6,329,733 B1 * | 12/2001 | Katsumata | F16C 32/0461 |
| | | | 310/216.091 |
| 6,414,410 B1 * | 7/2002 | Nakamura | H02K 3/12 |
| | | | 310/179 |
| 6,885,127 B1 * | 4/2005 | Higashino | H02K 1/16 |
| | | | 310/179 |
| 7,132,773 B2 * | 11/2006 | Hans | H02K 21/16 |
| | | | 310/184 |
| 7,982,356 B2 * | 7/2011 | Buban | H02K 1/148 |
| | | | 29/596 |
| 8,536,754 B2 * | 9/2013 | Dajaku | H02K 1/165 |
| | | | 310/180 |
| 9,231,460 B2 * | 1/2016 | Labbe | H02K 1/17 |
| 9,318,926 B2 * | 4/2016 | Dajaku | H02K 3/20 |
| 2003/0122442 A1 * | 7/2003 | Jack | H02K 1/24 |
| | | | 310/216.008 |
| 2005/0280326 A1 * | 12/2005 | Hans | H02K 21/16 |
| | | | 310/184 |
| 2006/0290225 A1 | 12/2006 | Mipo et al. | |
| 2009/0174280 A1 * | 7/2009 | Prudham | H02K 1/14 |
| | | | 310/216.022 |
| 2010/0054971 A1 * | 3/2010 | Li | H02K 1/14 |
| | | | 417/423.7 |
| 2010/0176677 A1 | 7/2010 | Labbe et al. | |
| 2011/0169369 A1 | 7/2011 | Liang et al. | |
| 2011/0316368 A1 * | 12/2011 | Dajaku | H02K 1/146 |
| | | | 310/59 |
| 2012/0025634 A1 * | 2/2012 | Dajaku | H02K 3/20 |
| | | | 310/12.21 |
| 2012/0228981 A1 * | 9/2012 | Dajaku | H02K 1/165 |
| | | | 310/195 |
| 2013/0169097 A1 * | 7/2013 | Saban | H02K 21/14 |
| | | | 310/156.08 |

FOREIGN PATENT DOCUMENTS

| | | | | |
|---|---|---|---|---|
| DE | 19510729 A1 * | 9/1996 | | H02K 1/146 |
| DE | 10229333 A1 | 1/2004 | | |
| DE | 102008001538 A1 | 11/2009 | | |
| DE | 102011008198 A1 | 7/2011 | | |
| DE | 102010038764 A1 | 2/2012 | | |
| EP | 0104382 A1 | 4/1984 | | |
| EP | 0994555 A2 | 4/2000 | | |
| JP | 2003319575 A | 11/2003 | | |
| WO | 20101060409 A1 | 6/2010 | | |
| WO | WO 2010060409 A1 * | 6/2010 | | H02K 1/146 |
| WO | 2012/016746 A2 | 2/2012 | | |

* cited by examiner

ELECTRIC MACHINE WITH A STATOR HAVING SLOTS AT THE TOOTH FOR REDUCING THE FUNDAMENTAL WAVE OF THE MAGNETIC FLUX

The proposed arrangement relates to an electric machine.

An electric machine usually comprises a stator fixed to the housing as well as a rotor which is movable relative to the stator. The rotor may be supported so as to be rotatable with respect to the stator or can be linearly movable relative to it, for example. Electric machines are assigned to the category of electromechanical energy converters. They can work as a motor or as a generator.

In recent years, it has turned out that brushless machines comprising concentrated windings are increasingly used in numerous industrial applications. These machines may work through excitation by means of a permanent magnet and/or be realized as a reluctance machine.

Machines of this type are distinguished, for instance, by advantages in terms of a compact design, a simple manufacture, high winding factors and low copper losses as well as short winding heads.

The disadvantages of such machines are the numerous harmonic components of the magnetomotive force caused by the stator when in operation, except of the component which is utilized as the operating wave of the electric machine. These harmonic waves are obtained when the magnetomotive force is split into its harmonic components, for instance by means of a Fourier decomposition.

Consequences of these undesired harmonic components are iron losses and magnet losses of the rotor as well as iron losses in the stator. Among other things, the harmonic components (except of the one which is used as the operating wave of the electric machine) are disadvantageous because they result in losses and also may cause undesired, in particular acoustic impairments and vibrations during the operation of the machine.

The concentrated winding mentioned above may be implemented as a single-layer or multi-layer winding. A single-layer winding is here understood to be a winding where only every other tooth along the circumference of the stator is provided with an electric winding. Here, a tooth is formed between two adjacent slots of the stator, the slots serving to house the electric winding. In contrast to a distributed winding, a concentrated winding is distinguished in that the coils of the winding are wound around one tooth each.

It is an object to reduce harmonic components of the magnetomotive force which differ from the operating wave of the machine, and in this way reduce the disadvantages mentioned above.

The object is achieved by an electric machine comprising the features of claim 1.

In one embodiment, an electric machine comprises a stator and a rotor movable relative to the stator. The stator comprises slots for housing electric windings. Teeth of the stator are formed between adjacent slots of the stator. During operation, the electric machine has an operating wave of the magnetomotive force which is different from a fundamental wave of the magnetic flux of the magnetomotive force. Further, the stator comprises at least one recess which is arranged in the tooth area of the stator, i.e. in the area between two slots, and extends substantially in the radial direction.

The stator is usually made of iron and is realized preferably by means of stacks of metal sheets. Hence, the term "recess" means the absence of iron and also that there is no material which would carry the magnetic flux in such a way that the magnetic flux is impeded in the region of the recess.

Coils of an electric winding system are wound around the teeth of the stator. By way of example, each tooth of the stator or every other tooth may be provided with a coil for realizing a single-layer or dual-layer winding. Other concentrated winding systems are also possible.

The recess in the area of the tooth results in that any undesired harmonic components of the magnetomotive force are significantly reduced. All those harmonic components are deemed to be undesired which are not utilized as an operating wave. These may be higher harmonic waves and/or sub-harmonic waves, with the terms "higher" and "sub" being related in each case to the order of the harmonic wave which is used as the operating wave.

The reduction of the undesired harmonic waves, for example the fundamental wave, to which the ordinal number 1 is assigned, has the effect that the efficiency of the machine is enhanced and/or undesired acoustic impairments and vibrations are reduced.

The recess in the tooth area, however, does not only result in a significant reduction of the fundamental wave, but also creates a reduction of other undesired harmonic waves and at the same time even an increase in the harmonic wave which is used as the operating wave. In this way, the suggested measure even enhances the nominal torque of the machine.

The suggested recess does not involve any appreciable extra manufacturing effort, as the stacks of metal sheets of the stator usually are stamped parts anyway, and the recess can be stamped out in the same working step.

In one design, the recess forms a mechanical barrier for reducing the fundamental wave of the magnetic flux in the tooth area.

Here, the fundamental wave is attenuated by 50% or more, for instance.

In one embodiment, the operating wave is increased in the tooth area because of the mechanical barrier. In other words, the recess is formed in the tooth area in such a manner that the operating wave is enhanced.

The recess may be implemented as an additional slot in the tooth area of the stator.

In one embodiment, the recess is provided in the tooth area and extends into a yoke area of the stator. This has the effect that the absence of stator iron material is also achieved in the yoke area.

In doing so, the slot may be provided on a side of the stator facing the rotor and/or on a side of the stator facing away from the rotor.

As an alternative, the recess may be provided as a fully penetrating slot reaching from the side of the stator facing the rotor to the side of the stator facing away from the rotor, and therefore the tooth is divided in two tooth elements which are not connected to each other. The term "unconnected" is related here to the magnetic flux in the iron material of the stator and means, for instance, that the absence of the stator iron or of any other material carrying the magnetic flux is provided or other measures for attenuating the magnetic flux in this area have been taken.

In the case of the separate stator areas, the stator consists of several stator areas arranged along the circumference. Each of the stator areas comprises at least one slot area and two adjoining, oppositely arranged tooth elements. Respective tooth elements of adjacent stator areas are spaced from each other by the recess or are coupled to each other.

The recess may be formed in each tooth of the stator or in every other tooth of the stator, for example. If the recess is formed in each tooth of the stator, it may be implemented e.g. in alternating fashion as a slot starting from the side of the stator facing the rotor or the side of the stator facing away from the rotor. By way of example, the electric machine may be realized as a machine in which the ratio of the number of the slots to the number of the poles in the rotor is 12:10 or 12:14. It is also possible to select integral multiples for the number of the slots and/or the number of the poles.

The electric machine may be implemented as a linear machine, axial flux machine, radial flux machine, asynchronous machine or synchronous machine. Moreover, it may be constructed to have an internal rotor or an external rotor. In the case of an asynchronous machine, the rotor of the machine may be implemented as a cage rotor or multi-layer rotor. In the case of a synchronous machine, the rotor may be a permanent magnet rotor, a rotor comprising buried magnets, an electrically supplied rotor, in particular a solid pole rotor, salient pole rotor, heteropolar rotor, homopolar rotor. In addition or as an alternative, the machine may comprise a reluctance rotor.

The proposed arrangement is explained in more detail below with the aid of several exemplary embodiments on the basis of the drawings.

Here, identical reference numerals designate identical parts or parts with identical function.

DETAILED DESCRIPTION OF THE DRAWINGS

Figure 1:
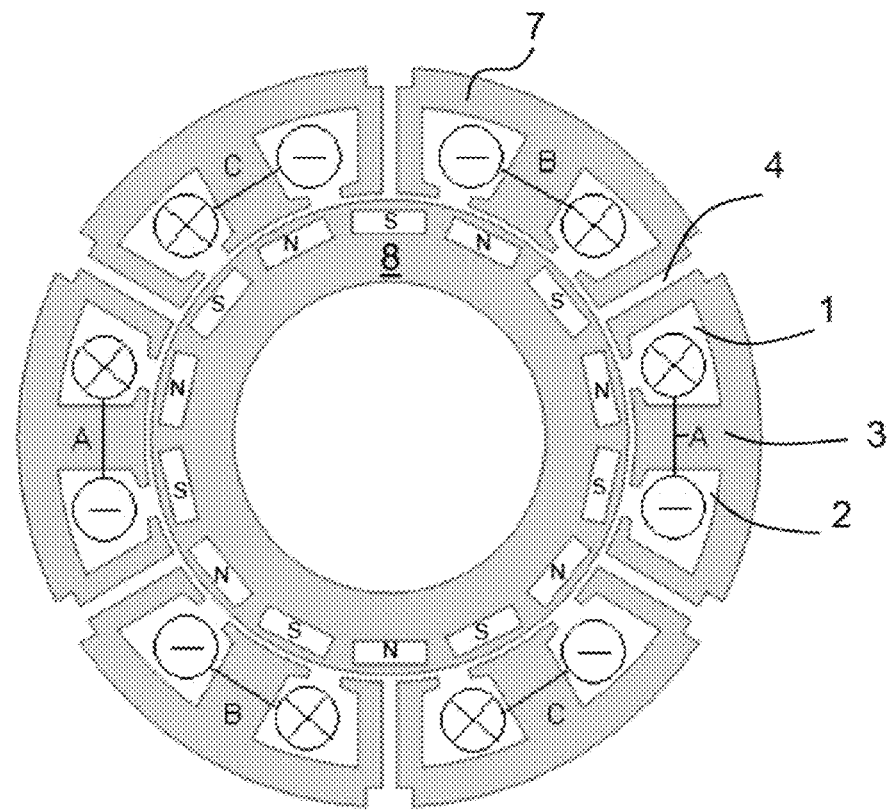
FIG. 1 shows an exemplary embodiment of an electric machine according to the suggested principle and in cross-section.

FIG. 1 shows an exemplary embodiment of an electric machine comprising a stator 7 and a rotor 8. The machine is implemented as a rotating electric machine comprising an external stator and an internal rotor 8. The stator comprises twelve teeth and twelve slots. The rotor has 14 poles realized with permanent magnets which are distributed along the circumference and implemented with north and south poles N, S in alternating manner. The stator teeth are provided with a concentrated single-layer winding. This means that every other tooth 3 is provided with an electric coil, the respectively intermediate teeth remaining free from any winding. The stator is wound with an electric three-phase system comprising three electric strands A, B, C which are associated to three phases of a three-phase current system which are shifted by 120° in the electric view.

All winding-free teeth are provided with a recess 4 which forms a cut through the respective tooth in the radial direction. The recess extends from the side of the stator facing the rotor to the outer circumference of the stator in the yoke area thereof and divides the tooth centrally and symmetrically in two equal halves. Thus, the stator is divided into six stator areas. Each of the stator areas is separated from adjacent stator areas in the stator iron; this means that the magnetic flux in the stator, occurring when the machine is in operation, is significantly reduced by the magnetic barrier realized by the recess 4. This affects in particular the fundamental wave.

In the present machine, the seventh harmonic wave of the magnetomotive force is used as the operating wave.

Starting from the rotor, the recess 4 has a constant cross-section toward the outer side of the stator and comprises an additional cross-sectional enlargement of the recess on the stator periphery, i.e. in the yoke area of the stator. This enlargement is no longer in the actual tooth area but in the region of the stator yoke outside on the stator.

The six stator areas have an identical design, are distributed along the circumference of the stator and all have a central tooth 3 provided with a winding, adjoined by opposite slots 1, 2 housing one electric winding in each case. The slots are adjoined by tooth halves which remain without any winding in this example.

Figure 2:
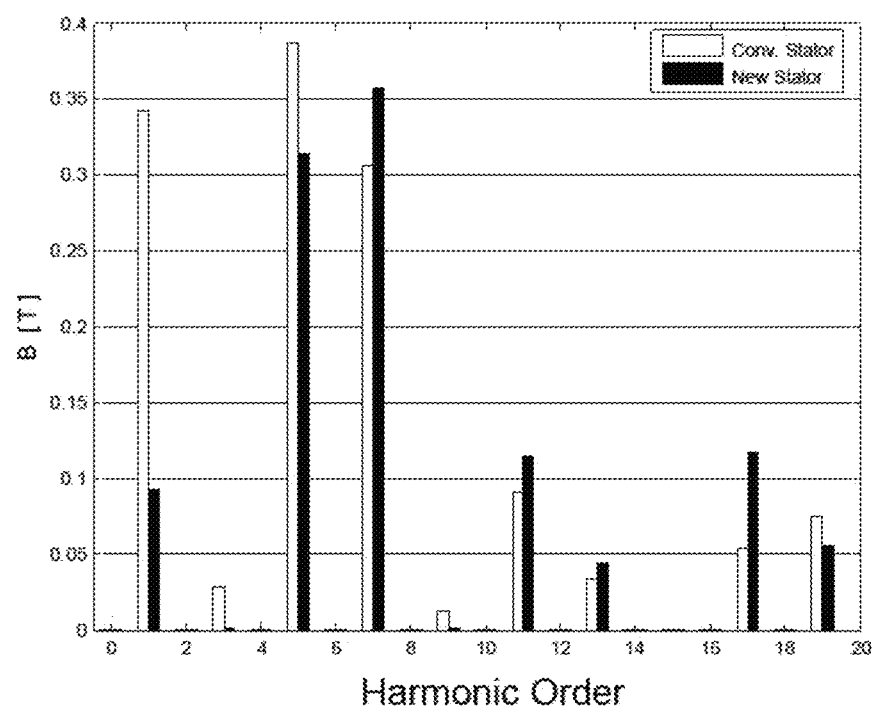
FIG. 2 shows a comparison of the distribution of the air gap induction and of corresponding harmonic waves in their Fourier analysis for the design of the machine of FIG. 1, compared to a conventional machine.

FIG. 2 shows a comparison of the distribution of the harmonic waves of the air gap induction, in which a conventional stator without the recesses 4 and a stator according to the design of FIG. 1 are illustrated side by side for comparison.

It can be seen that the first subharmonic wave, i.e. the fundamental wave, is reduced by 73%. The fifth subharmonic wave is reduced by approximately 19%. At the same time, it is noted that the operating wave, namely the seventh harmonic wave, is increased by about 17%.

In summary, the new stator topology significantly reduces undesired subharmonic waves; hence, the losses in the machine are lowered and the efficiency is increased. On the other hand, the operating wave mainly responsible for the nominal torque of the machine is clearly enhanced at the same time, in the example by 17%.

In comparison with other known measures for reducing undesired harmonic waves, the suggested principle is distinguished in that there is not only no undesired negative impact on the operating wave and the torque of the machine; in fact, the reverse case occurs, namely an enhancement of the operating wave.

Figure 3:
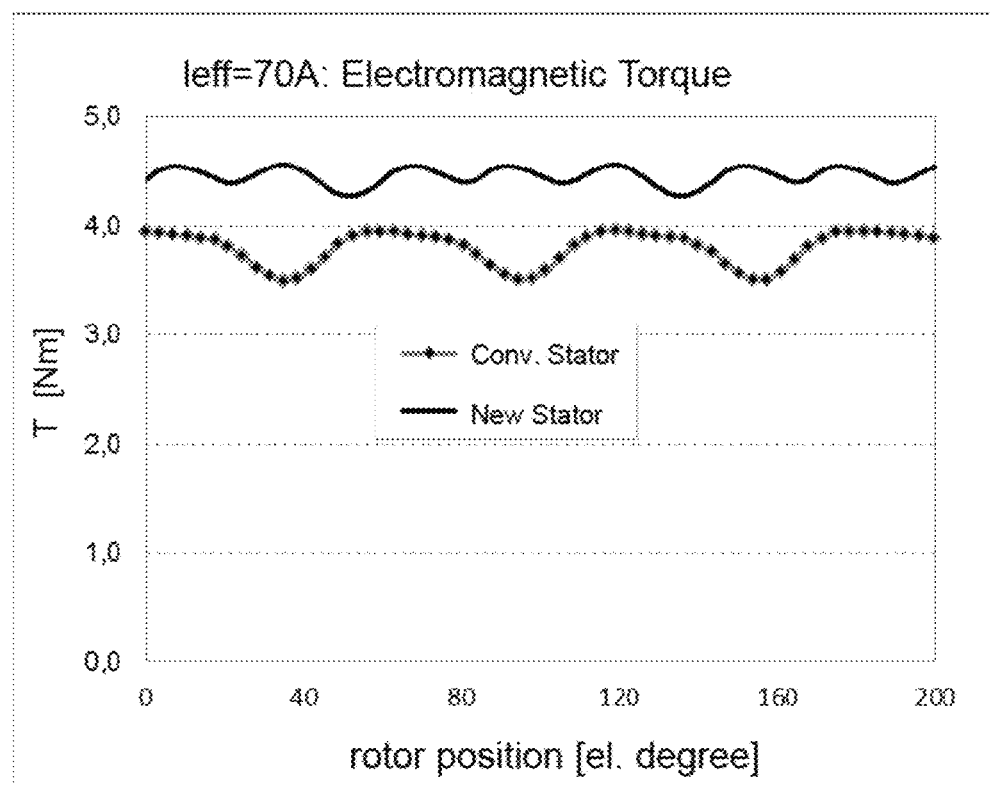
FIG. 3 shows an exemplary diagram of the course of the electromagnetic torque over different electric angular positions.

FIG. 3 clarifies this advantageous mode of action of the suggested principle according to the design of FIG. 1. It can be seen clearly that for the new design—for an effective current of 70 amps—the electromagnetic torque, plotted over the angular position in electric degrees, has higher absolute values, on the one hand, and shows less ripples on the other hand.

Figure 4:
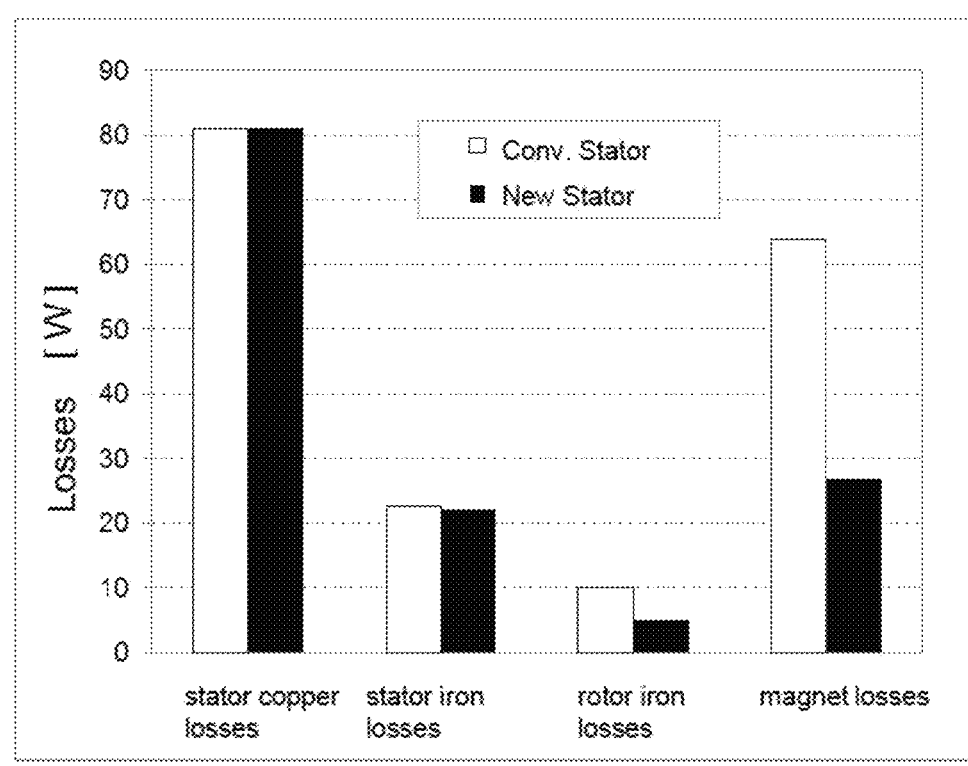
FIG. 4 shows a comparison the losses on the basis of an exemplary diagram.

FIG. 4 clearly illustrates the advantages of the suggested principle with regard to the losses. The stator copper losses, the stator iron losses, the rotor iron losses and the magnet losses of a conventional machine are compared in four depictions with the new machine according to FIG. 1. It can be seen straight away that the rotor iron and magnet losses are significantly reduced with the suggested principle, in fact are reduced by more than fifty percent. With regard to the stator copper and stator iron losses, there will be no disadvantages but rather slight advantages of the new machine topology.

The same load conditions exist for the diagrams of FIG. 3 and FIG. 4.

Alternative embodiments of the recess in the stator, namely in the tooth area, for the formation of a barrier for the fundamental wave are presented in the following. In addition, the suggested principle is transferred to other stator and rotor geometries as well as to other rotor types etc.

Figure 5:
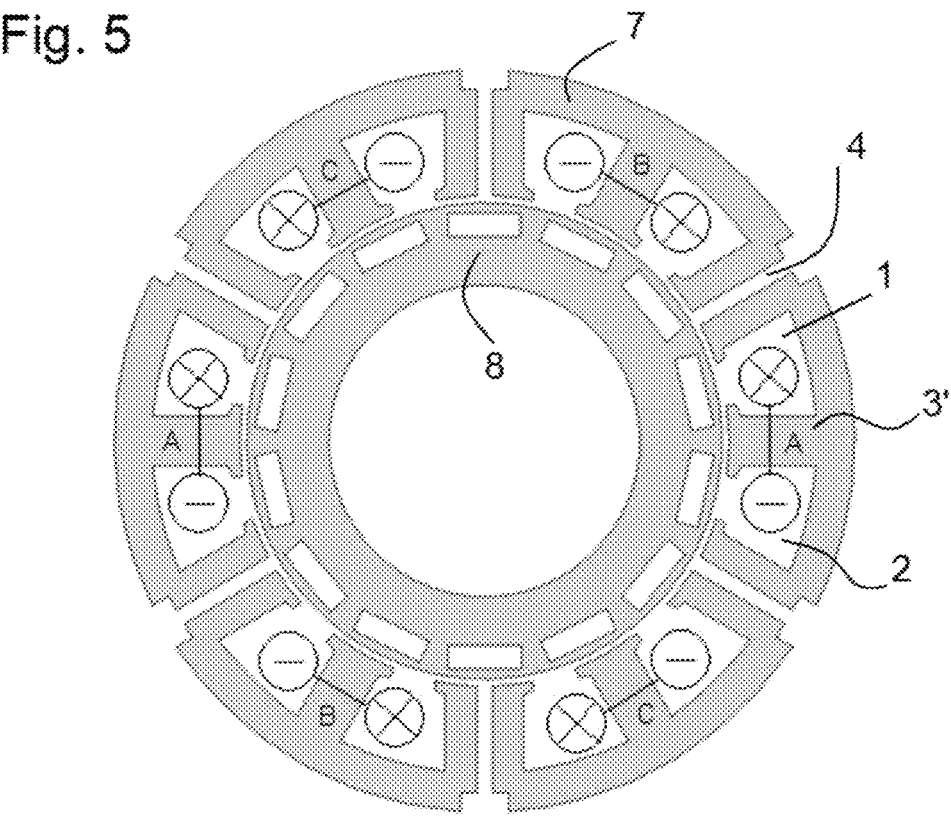
FIG. 5 shows an alternative embodiment according to the suggested principle on the basis of an example with different tooth widths.

By way of example, FIG. 5 shows an alternative embodiment to the exemplary design of FIG. 1. In contrast to FIG. 1, the teeth have different tooth widths. Here too, the recesses are formed in every other tooth. The teeth 3' situated therebetween and provided with a winding, however, have a smaller cross-section which is referred to as the tooth width. For these and the following Figures, a multi-layer winding may also be used instead of the illustrated single-layer winding.

According to FIG. 5, the effective tooth width of those teeth which are provided with a winding is adapted to the tooth width of the winding-free teeth which comprise the recess and in this way actually have a reduced cross-section.

Figure 6:
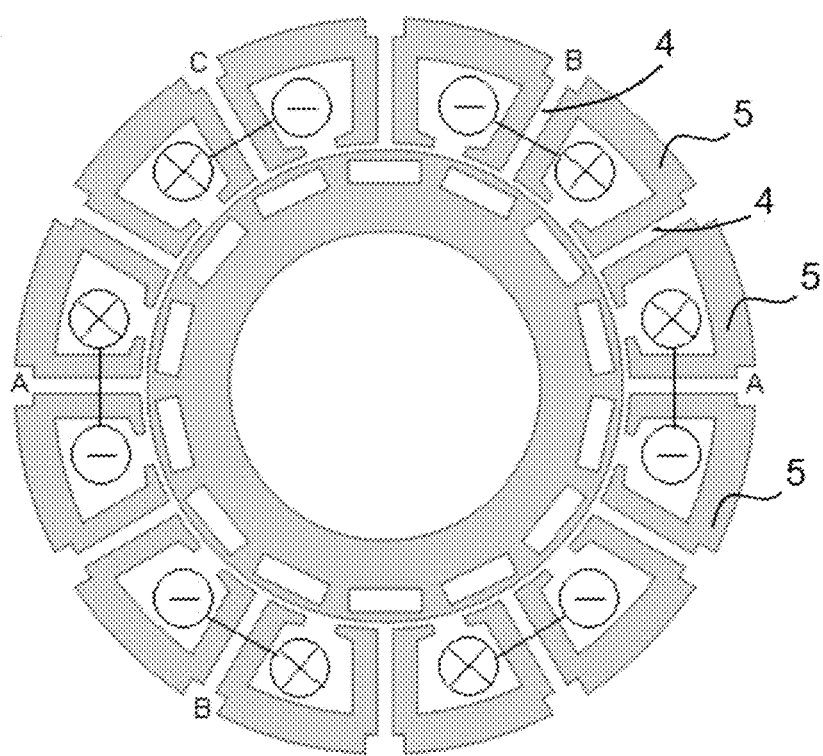
FIG. 6 shows a further exemplary embodiment according the suggested principle comprising recesses in all stator teeth.

FIG. 6 shows a further alternative exemplary embodiment as a modification of the design of FIG. 1. Here, the recess 4 is provided not only in the winding-free teeth, but also in the teeth equipped with a winding.

Figure 7:
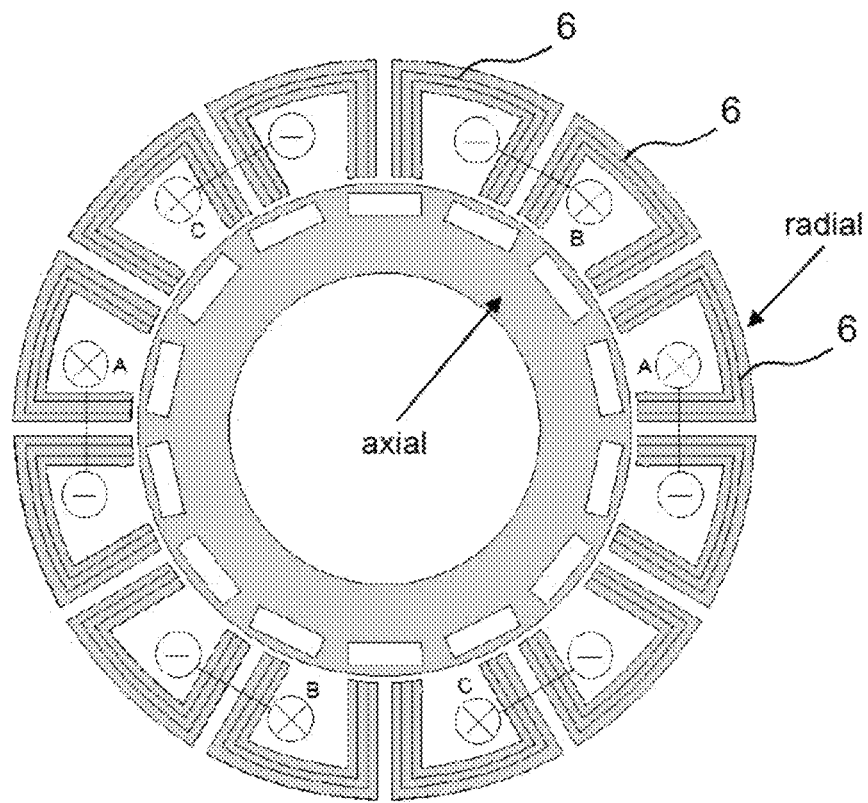
FIG. 7 shows a further exemplary embodiment according the suggested principle, the iron material being laminated radially and in circumferential direction.

A further development of the principle of FIG. 6 is shown in FIG. 7. As in the examples of FIG. 6 and FIG. 7 the stator is subdivided into twelve U-shaped stator elements in total, which have no iron connection among one another but are spaced from one another, the U-shape of the twelve stator elements can be realized by means of iron cores which are laminated in radial direction and in circumferential direction, but not in axial direction. This results in a different structure of the sheet metal stack of the stator. While the rotor according to FIG. 7 still has an axially laminated stack of metal sheets, the stack of the stator is radially laminated here. This has benefits with regard to eddy current losses and an efficient utilization of the employed iron material.

Figure 8:
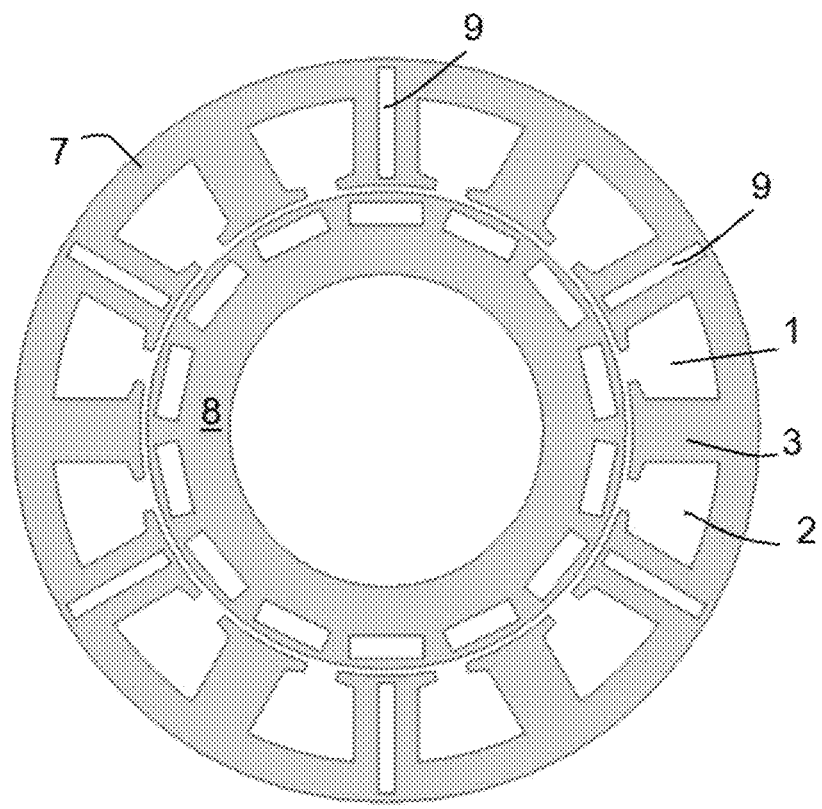
FIG. 8 shows an exemplary embodiment according the suggested principle comprising flux barriers in every other tooth.

FIG. 8 shows another variation of the design of FIG. 1. The recesses 4 of FIG. 1 are not formed as continuous slots, but as rectangular recesses 9 which extend in radial direction and are formed in every other tooth of the stator; however, a thin-walled iron connection remains between the individual stator areas on the side of the stator facing the rotor or the side of the stator facing away from the rotor. Nevertheless, the recess 4 extends into the yoke area of the stator.

The winding system of FIG. 1 is not indicated in FIG. 8 in order to give a clearer illustration.

Figure 9:
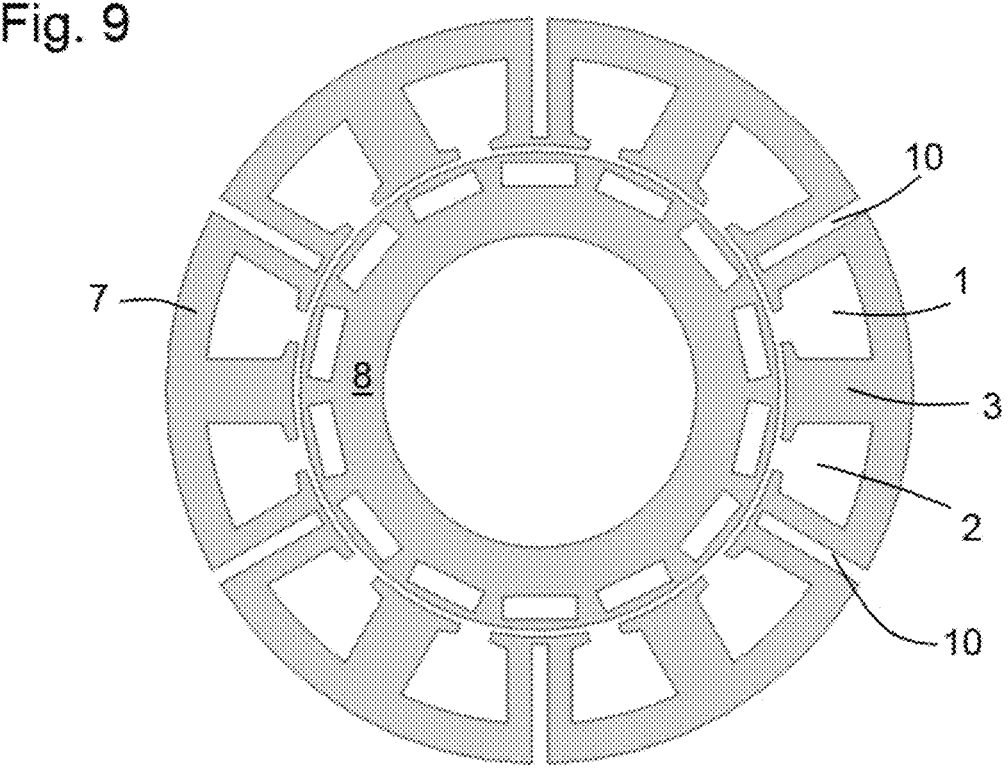
FIG. 9 shows another exemplary embodiment of the flux barriers.

On the basis of FIG. 1, FIG. 9 shows a further modification of the geometry of the recesses. Instead of the continuous recesses 4 which divide the stator as a whole into individual stator areas, a slot is provided in every other tooth in FIG. 9, which is worked into the material from the periphery of the stator toward the side of the stator facing the rotor. Said slot 10 has a constant cross-section and extends from the outer side of the stator to close to the tooth front opposite the rotor, but a thin zone of iron material is left at the end of the tooth at the side facing the rotor.

Figure 10:
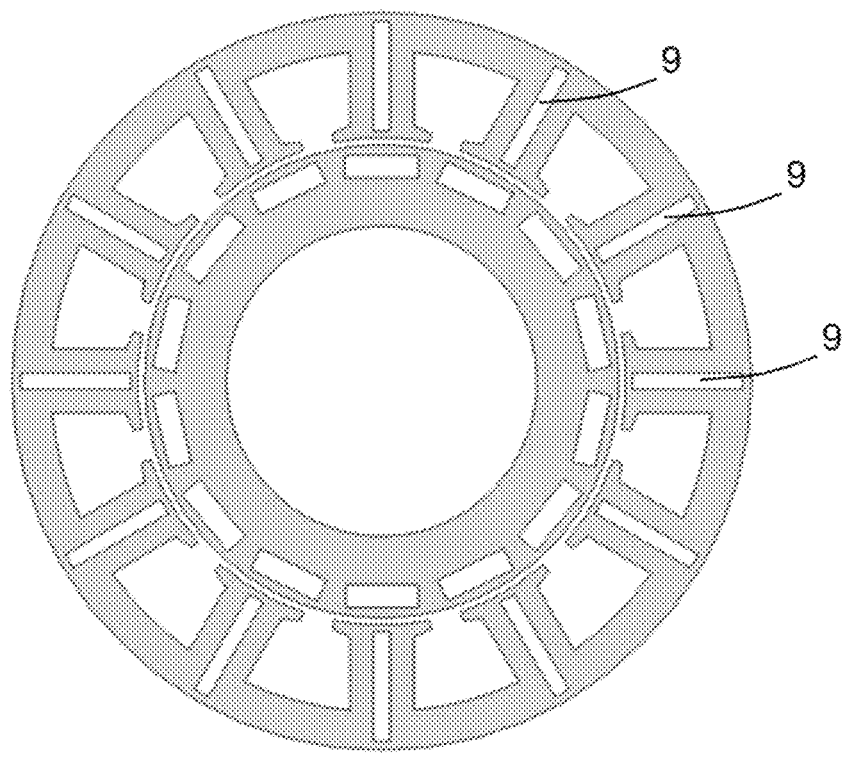
FIG. 10 shows a further exemplary embodiment of the flux barriers provided in all teeth.

FIG. 10 shows an alternative embodiment on the basis of FIG. 8, which is similar to the latter to a large extent. In a variant of FIG. 8, however, the design of FIG. 10 does not have the recess 9 provided in every other tooth of the stator but in each tooth of the stator, i.e. in the winding-free teeth as well as in those which are provided with a winding, in the case of a concentrated single-layer winding. A web of iron material of the stator is left on the side of the stator facing away from the rotor as well as on the side of the stator facing the rotor, and therefore there is no continuous slot in the stator. In this example, too, the recess extends into the yoke area of the stator.

Figure 11:
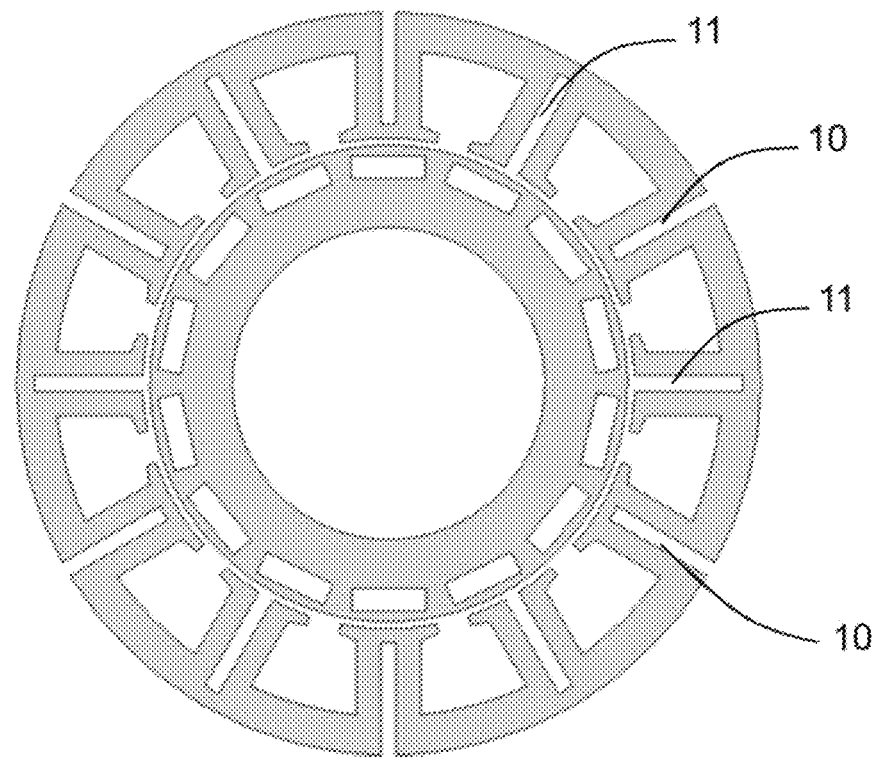
FIG. 11 shows a further exemplary embodiment comprising different flux barriers in adjacent teeth.

FIG. 11 shows a further development of the design of FIG. 9. In a variant of FIG. 9, the teeth 3 which are realized according to FIG. 9 without any recess are provided with a slot 11 here; in contrast to the slots 10 provided according to FIG. 9, however, the slots 11 comprise an opening on the side of the stator facing the rotor. Thus, adjacent teeth are provided in the design of FIG. 11 in alternating manner with slots 11 which have an opening on the side facing the rotor and slots 10 which have an opening on the side of the stator facing away from the rotor. On the respectively opposite side of the slots 10, 11, a web of iron material is left. In all of the slots 10, 11, the recess extends into the yoke area of the stator in this example as well.

Figure 12:
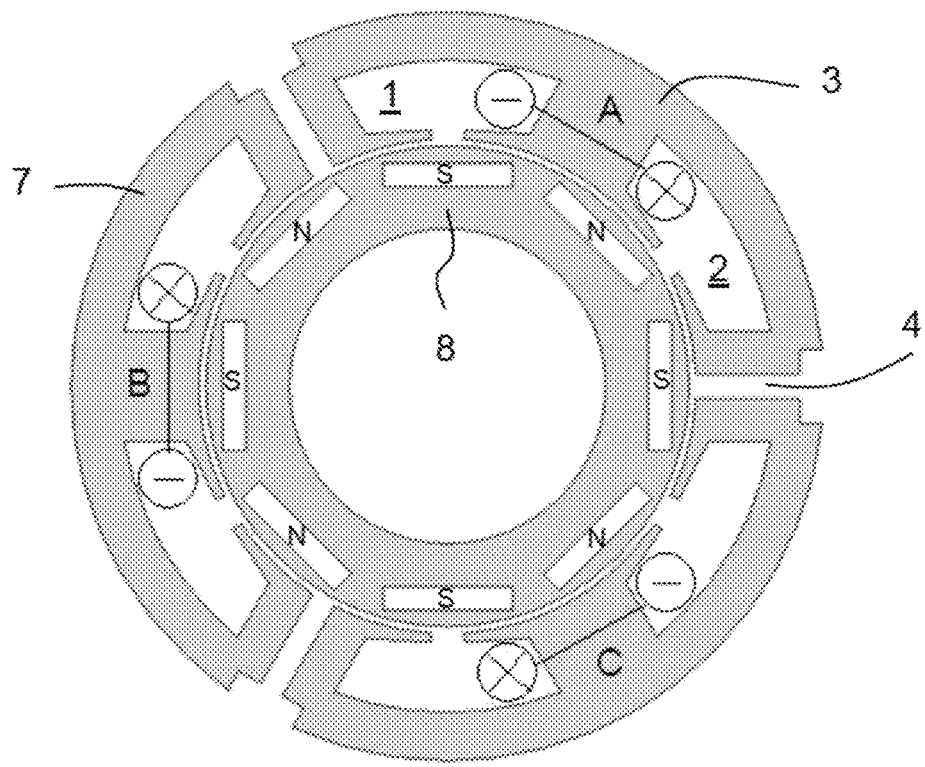
FIG. 12 shows an exemplary embodiment according the suggested principle for a machine with eight poles.

FIG. 12 shows a modification of the design of FIG. 1, in which the suggested principle of the machine comprising twelve teeth and 14 poles as is shown in FIG. 1 is transferred to a machine with only six teeth and eight poles.

Accordingly, eight magnets are distributed in the rotor along of the circumference, forming north and south poles S, N in alternating manner. In this example, they are designed as buried permanent magnets.

Corresponding to FIG. 1, the stator is provided with recesses 4 in every other tooth along the circumference of the stator, in the example especially in those teeth which will not receive a winding, as a single-layer winding in concentrated design is involved. The teeth 3 wound in concentrated manner by the three-phase electric system remain without any mechanical barrier for the flux.

Figure 13:
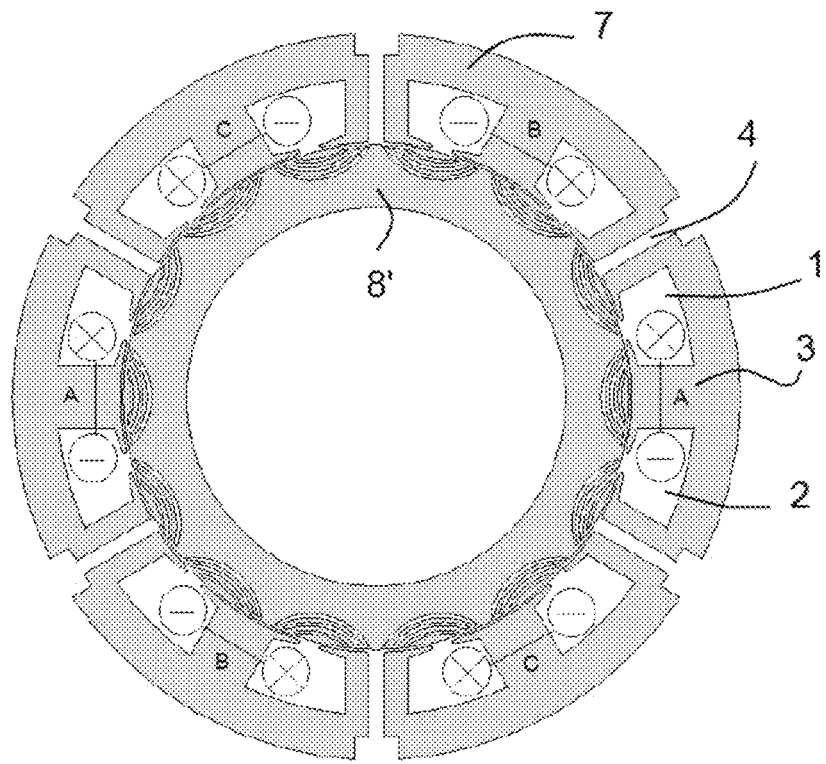
FIG. 13 shows an exemplary embodiment of the suggested principle comprising a reluctance rotor.

In a variant of the design of FIG. 1, FIG. 13 shows another rotor topology, the stator 7 of FIG. 13 being the same as the one of FIG. 1.

The rotor 8' of FIG. 13 is not realized as a rotor with buried permanent magnets, but as a reluctance rotor. In this arrangement, a total of 14 rotor poles is formed along the circumference of the rotor 8'. For each pole there are several zones (without iron) repeatedly incorporated in V-shaped fashion, i.e. air. This results in a reluctance rotor without permanent magnets 8'.

Figure 14:
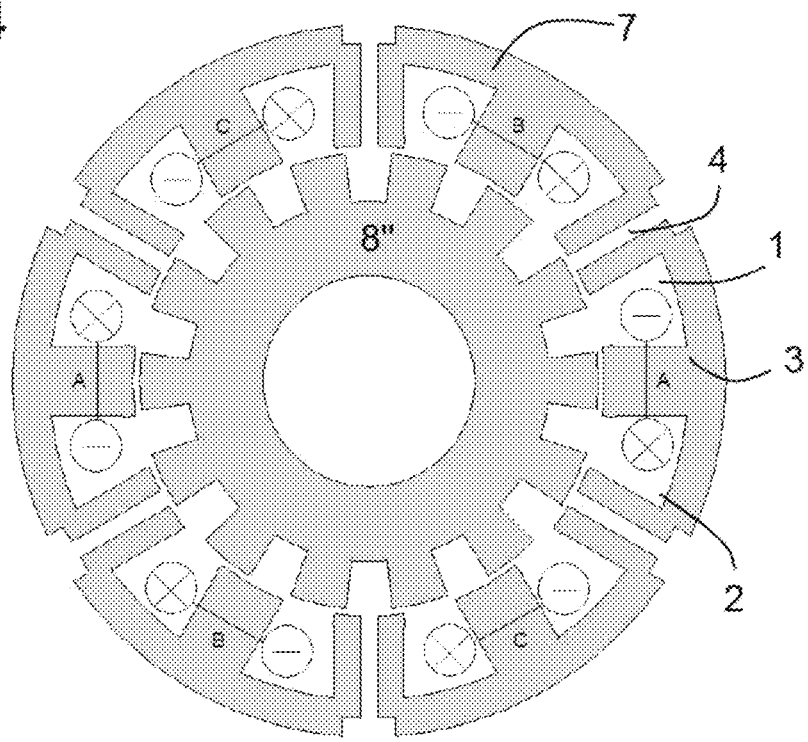
FIG. 14 shows an exemplary embodiment of the suggested principle applied to a commutated reluctance machine.

FIG. 14 shows another reluctance rotor. In FIG. 14, the stator 7 is again the same as the one shown in FIG. 1. In contrast to FIG. 1, however, the rotor 8" is formed with a cross-section like a toothed wheel comprising teeth in rectangular shape and hence is designed as a reluctance rotor, again without permanent magnets. This principle is also referred to as a commutated reluctance machine and in the present case is realized with a geometry with twelve slots, i.e. twelve teeth and 14 poles.

The invention claimed is:

1. An electric machine comprising: a stator including slots for receiving electric windings, teeth of the stator being formed between adjacent slots, respectively; and a rotor movable relative to the stator, wherein, during operation, an operating wave of a magnetomotive force is different from a fundamental wave of a magnetic; flux, wherein the stator comprises at least one recess which extends substantially in a radial direction from a periphery of the stator into a respective tooth of the stator to a portion of the respective tooth proximate the rotor, wherein the stator corn rises at least one tooth without the at least one recess, wherein the at least one recess is formed such that a first harmonic wave of the magnetomotive force used as the operating wave is greater than a second harmonic wave of the magnetomotive force used as the operating wave without the at least one recess, wherein the electric machine is not a step motor, and wherein the at least one recess forms a mechanical barrier for reducing the fundamental wave of the magnetic flux and for increasing the operating wave.

2. The electric machine according to claim 1, wherein the at least one recess is formed such that the fundamental wave in the respective tooth of the stator is attenuated by 50% or more.

3. The electric machine according to claim 1, wherein the at least one recess extends from inside the respective tooth of the stator into a yoke area of the stator.

4. The electric machine according to claim 1, wherein the at least one recess is formed at least in every other tooth of the stator.

5. The electric machine according to claim 1, wherein a ratio of a number of the slots to a number of poles in the rotor is 12/10 or 12/14 or is equal to integer multiples greater than zero of the number of the slots and the number of poles.

6. The electric machine according to claim 1, wherein a ratio of a number of the slots to a number of poles in the rotor is 6/8 or is equal to integer multiples greater than zero of the number of the slots and the number of poles.

7. The electric machine according to claim 1, wherein the electric machine comprises one of the following types: a linear machine, an axial flux machine, a radial flux machine, an asynchronous machine, or a synchronous machine.

8. The electric machine according to claim 1, which is made as a first machine comprising an internal rotor or as a second machine comprising an external rotor.

9. The electric machine according to claim 1, wherein the rotor is of one of the following types: a cage rotor, a multi-layer rotor when the electric machine is an asynchronous machine, a permanent magnet rotor when the electric machine is a synchronous machine, a magnetic rotor comprising buried magnets, an electrically supplied rotor, a solid pole rotor, a salient pole rotor, a heteropolar rotor, a homopolar rotor, or a reluctance rotor.

10. The electric machine according to claim 1, wherein the at least one recess comprises an additional slot in the respective tooth of the stator.

11. The electric machine according to claim 10, wherein the additional slot is provided on a side of the stator facing the rotor.

12. The electric machine according to claim 10, wherein the additional slot is provided on a side of the stator facing away from the rotor.

13. The electric machine according to claim 1, wherein the at least one recess is provided as a fully penetrating slot reaching from a first side of the stator facing the rotor to a second side of the stator facing away from the rotor such that the tooth is divided into two tooth elements without any iron connection between them.

14. The electric machine according to claim 13, wherein stator areas that are separate in iron each comprise a slot area and two neighboring tooth elements oppositely adjoining thereto.

15. The electric machine according to claim 14, wherein each of the stator areas comprises a radially laminated, bent stack of metal sheets.

16. An electric machine comprising:
a stator including slots for receiving electric windings, teeth of the stator being formed between adjacent slots, respectively; and
a rotor movable relative to the stator,
wherein, during operation, an operating wave of a magnetomotive force is different from a fundamental wave of a magnetic flux,
wherein the stator comprises at least one recess which extends substantially in a radial direction from a periphery of the stator into a respective every other tooth of the stator to a portion of the respective every other tooth proximate the rotor,
wherein the at least one recess is formed such that a first harmonic wave of the magnetomotive force used as the operating wave is greater than a second harmonic wave of the magnetomotive force used as the operating wave without the at least one recess,
wherein the electric machine is not a step motor, and
wherein the at least one recess forms a mechanical barrier for reducing the fundamental wave of the magnetic flux and for increasing the operating wave.

* * * * *